Sept. 10, 1929.  J. C. SNELL  1,727,569
OIL CHANGE INDICATOR
Filed July 5, 1927
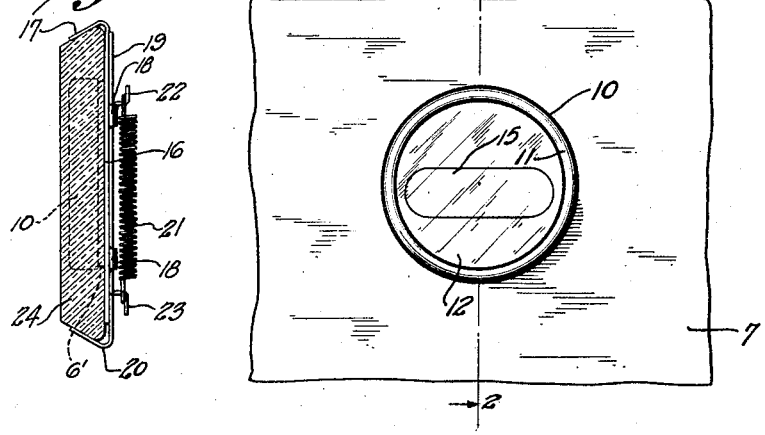
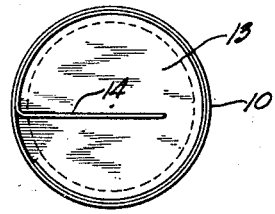
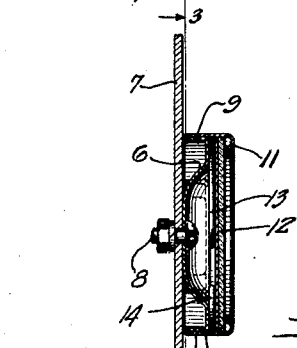
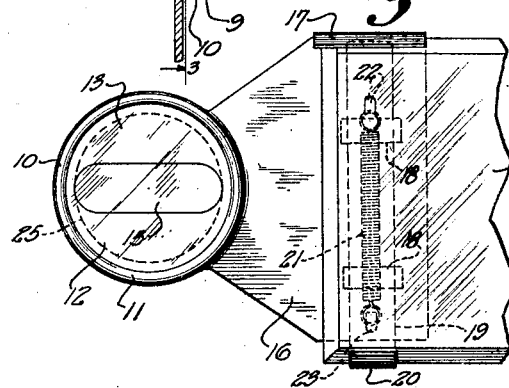
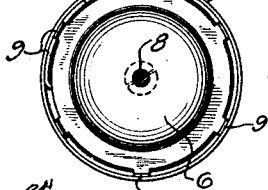
INVENTOR.
James C. Snell.
BY Morsell, Keeney & Morsell
ATTORNEYS.

Patented Sept. 10, 1929.

1,727,569

UNITED STATES PATENT OFFICE.

JAMES C. SNELL, OF MILWAUKEE, WISCONSIN, ASSIGNOR TO S. K. S. MFG. CO., A COPARTNERSHIP CONSISTING OF JAMES C. SNELL, GEORGE W. KNIGHT, AND EMIL SINNER, ALL OF MILWAUKEE, WISCONSIN.

OIL-CHANGE INDICATOR.

Application filed July 5, 1927. Serial No. 203,389.

This invention relates to improvements in oil change indicators.

It is the primary object of the present invention to provide an oil change indicator adapted for permanent mounting on the instrument board of a motor vehicle and providing a neat and convenient record of the mileage at which the oil of the vehicle was last changed.

A further object of the invention is to provide an indicator of the class described in which the indicia is visible through transparent material but is protected against obliteration or erasing.

A further object of the invention is to provide an indicator of the class described which can be used as an advertising novelty, there being space for the display of advertising matter in addition to the oil record.

A further object of the invention is to provide an oil change indicator which is of very simple construction, is inexpensive to manufacture, is strong and durable, and is well adapted for the purpose described.

With the above and other objects in view the invention consists of the improved oil change indicator, and its parts and combinations as set forth in the claim, and all equivalents thereof.

In the accompanying drawing in which the same reference characters indicate the same parts in all of the views:

Fig. 1 is a front view of the oil change indicator;

Fig. 2 is a vertical sectional view thereof taken on line 2—2 of Fig. 1;

Fig. 3 is a sectional view taken on line 3—3 of Fig. 2;

Fig. 4 is a rear view of the indicator cover removed;

Fig. 5 is a view illustrating a modified form of the invention; and

Fig. 6 is an edge view thereof as attached to a support.

Referring now more particularly to the drawing it will appear that the numeral 6 indicates a dished circular plate secured through its mid-portion to the instrument board 7 of a motor vehicle by a bolt or screw 8. The periphery of the dished plate 6 is formed with a plurality of spaced apart inturned slightly yielding tongues 9.

The indicator further includes a cover member 10 having an open front portion defined by a rolled portion 11 against which is positioned a dial 12 of transparent material and within the cover member. Positioned against the inner face of the dial is a circular sheet 13 formed of celluloid or other suitable material which will readily removably receive writing. The sheet 13 and the dial 12 are held firmly in position by a removable spring 14. It should be observed that the front face of the sheet 13 is provided with a defined area 15 for oil change markings while the remainder of the front face may have suitable advertising matter delineated thereon, if desired.

In use, the device is secured to the instrument board of a motor vehicle as described, and in a convenient and visible position. The cover is removably held in position by frictional engagement with the yielding tongues 9 of the dished member. If the motor oil is changed the attendant or driver will merely remove the cover member and then remove therefrom the spring and record sheet 13. The old indication will then be rubbed out from the area 15 and the new mileage or indication will be delineated thereon. After this the parts are replaced and a neat and non-obliteratable record of the oil change is provided.

In the modified form of the invention shown in Figs. 5 and 6, the cover 10 has a frictional engagement with the body portion 6' which is cut out, as at 25, to permit access to the record sheet, and the body portion is provided with an off-set plate portion 16 formed at one edge with a flange 17. The plate portion 16 is formed with off-set slotted portions 18 through which a complementary attaching strip 19 is slidably mounted and said strip is formed at its end opposite the flange 17 with a similar flange 20. A coiled spring 21 is attached between a lug 22 on the plate portion 16 and a lug 23 on the attaching strip 19. Hence, the strip 19 is movable with respect to the plate portion 16 against the tension of said spring. This form of the device is adapted for quick attachment to a vehicle rear view mirror 24, being held thereto, as clearly shown.

It is evident that the vehicle operator or owner may personally attend to the recording of oil changes and will write the notations on the record sheet. He will, therefore, always recognize the writing, and unwarranted changes will be apparent.

From the foregoing description, it will be seen that the improved oil change indicator is of very simple and novel construction, and is well adapted for the purpose set forth.

I claim:

The combination with a fixed support having opposed angular edge portions, of an oil change indicator, comprising a body portion having an enlarged integral off-set plate portion, an open-faced cover for said body portion removably engaged by the body portion, an indicia member between said body portion and the cover, said plate portion having a flange engaging an edge portion of the support, a flanged attaching member slidably mounted on said plate portion, the flange thereof engaging an edge portion of the support, and a spring connected to said plate portion and to said slidable attaching member.

In testimony whereof, I affix my signature.

JAMES C. SNELL.